(12) United States Patent
Wolters-Zuur

(10) Patent No.: US 9,440,393 B2
(45) Date of Patent: Sep. 13, 2016

(54) POLYLACTIC ACID PRODUCTS AND THEIR USE

(75) Inventor: Astrid Marleen Wolters-Zuur, Markelo (NL)

(73) Assignee: LANKHORST PURE COMPOSITES B.V., Sneek (NL)

( * ) Notice: Subject to any disclaimer, the term of this patent is extended or adjusted under 35 U.S.C. 154(b) by 808 days.

(21) Appl. No.: 13/142,180

(22) PCT Filed: Dec. 23, 2009

(86) PCT No.: PCT/NL2009/050802
§ 371 (c)(1),
(2), (4) Date: Aug. 15, 2011

(87) PCT Pub. No.: WO2010/074576
PCT Pub. Date: Jul. 1, 2010

(65) Prior Publication Data
US 2011/0293877 A1    Dec. 1, 2011

(30) Foreign Application Priority Data

Dec. 24, 2008 (EP) .................... 08172939

(51) Int. Cl.
*D02G 3/02*  (2006.01)
*B29C 47/88* (2006.01)
(Continued)

(52) U.S. Cl.
CPC ......... *B29C 55/065* (2013.01); *B29C 47/0066* (2013.01); *B29C 47/8845* (2013.01); *C08J 5/18* (2013.01); *D02G 3/02* (2013.01); *D07B 5/00* (2013.01); *D07B 7/16* (2013.01); *B29C 47/0021* (2013.01); *B29C 47/0057* (2013.01); *B29C 2793/0063* (2013.01); *B29K 2067/046* (2013.01); *B29K 2995/006* (2013.01);
(Continued)

(58) Field of Classification Search
CPC ............... C08J 5/00; C08J 5/18; C08L 67/04
USPC ......................... 428/349, 346, 347, 480, 910
See application file for complete search history.

(56) References Cited

U.S. PATENT DOCUMENTS 6,713,175 B1 * 3/2004 Terada et al. ................. 428/349
7,351,785 B2 * 4/2008 Matsumoto et al. ......... 528/354
(Continued)

FOREIGN PATENT DOCUMENTS

CN     1384850 A    12/2002
CN     1687497 A    10/2005
(Continued)

OTHER PUBLICATIONS

Database CA [Online] Chemical Abstracts Service, Columbus, Ohio, US; Apr. 15, 2004, Nishimura, Hiroshi et al.: "Biodegradable packing bands for hand-tightening", XP002523183, retrieved from STN, Database accession No. 2004:305365, abstract, pp. 1-2.
(Continued)

*Primary Examiner* — Jennifer Chriss
*Assistant Examiner* — Ricardo Lopez
(74) *Attorney, Agent, or Firm* — Pearne & Gordon LLP

(57) ABSTRACT

The invention is directed to materials comprising polylactic acid (PLA). In accordance with the invention, PLA material is stretched in at least the machine direction at a total stretch ratio of 1:4 or more. These materials have excellent biodegradability and find use in horticulture, in particular for tying up plants or parts thereof.

15 Claims, 1 Drawing Sheet

Figure 1:
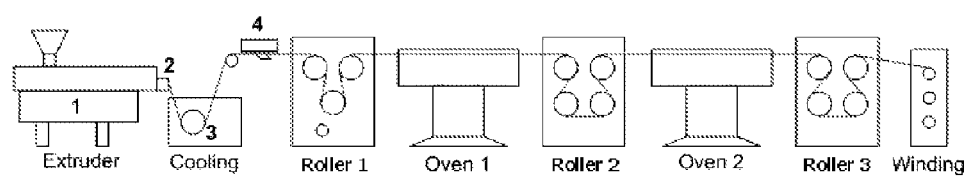

(51) Int. Cl.
   *B29C 55/06* (2006.01)
   *C08J 5/18* (2006.01)
   *D07B 5/00* (2006.01)
   *D07B 7/16* (2006.01)
   *B29C 47/00* (2006.01)
   *B29K 67/00* (2006.01)
   *D07B 1/02* (2006.01)

(52) U.S. Cl.
   CPC ............ *C08J 2367/04* (2013.01); *D07B 1/02* (2013.01); *D07B 2201/2003* (2013.01); *D07B 2201/2009* (2013.01); *D07B 2205/20* (2013.01); *D10B 2331/041* (2013.01); *Y10T 428/23993* (2015.04); *Y10T 428/2978* (2015.01)

(56) References Cited

U.S. PATENT DOCUMENTS

| 2004/0185282 | A1* | 9/2004 | Rosenbaum ............... C08J 5/18 428/480 |
| 2005/0182201 | A1 | 8/2005 | Matsumoto et al. |
| 2008/0161508 | A1 | 7/2008 | Matsumoto et al. |

FOREIGN PATENT DOCUMENTS

| EP | 1 514 902 A1 | 3/2005 |
| JP | H1060733 A | 3/1998 |
| JP | H11320674 A | 11/1999 |
| JP | 2002155440 A | 5/2002 |
| JP | 200119027 A | 8/2002 |
| JP | 2003 260733 A | 9/2003 |
| JP | 2004 115051 A | 4/2004 |
| JP | 2004183109 A * | 7/2004 |

OTHER PUBLICATIONS

Database CA [Online] Chemical Abstracts Service, Columbus, Ohio, US; Sep. 16, 2003, Tsurusaki, Yoshiyuki et al.: "Lactic acid polymer-based biaxially stretched films and their manufacture", XP002523184, retrieved from STN, Database accession No. 2003:723537, abstract, pp. 1-2.

Baiardo, Massimo et al., "Thermal and Mechanical Properties of Plasticized Poly(L-lactic acid)", Journal of Applied Polymer Science, vol. 90, (2003), pp. 1731-1738.

* cited by examiner

POLYLACTIC ACID PRODUCTS AND THEIR USE

The invention is directed to materials comprising polylactic acid (PLA).

Polylactid acid has structural formula —[—C(CH$_3$)—C(O)—O—]$_n$—. One of the key properties of PLA is that it is biodegradable, viz. it can break down when composted under influence of enzymatic action in the course of time. The development of biodegradable polymers is of particular interest in farming, in particular in horticulture. There has been a long-felt need for tapes (or threads, wires and the like) made of a biodegradable material, which can be used for instance to tie up plants and the like. Currently these tapes are made from non-degradable plastics, such as polyolefins. As a result, the organic waste that is produced (e.g. leaves, stems or entire plants) in current horticulture operation must be cleaned from these non-degradable plastics prior to composting to obtain a fully biodegradable stock. This cleaning is usually done by hand and is therefore costly and time-consuming.

It would be desirable to have biodegradable tapes that can be used for the above-indicated purpose in agricultural industry, in particular in horticulture. It is an object of the present invention to provide PLA materials for the above-indicated purposes, in particular for use in horticulture to tie up plants or pieces of plants.

In the past there have been attempts to produce PLA tapes for the above-mentioned purpose. However, these attempts have not produced products with suitable properties. It turned out that one of the important operations in producing suitable tapes for this purpose is a fibrillating step. The fibrillating step comprises applying one or more small cuts in the length direction of the tapes. Typically a needle roller or pin roller is used for this purpose. By doing so, the tape becomes more pliable, which is essential for obtaining a product that can actually be tied into a knot. Using prior art PLA materials, it was found that the fibrillating step could not be carried out successfully, because it would lead to cleaving or splitting of the tape, yielding an unsuitable product.

EP-A-1 514 902 describes biaxially stretched PLA films comprising a specific type of plasticizer. The films of EP-A-1 514 902 are stretched to an areal magnification ratio of 7 times or more. Longitudinal stretching at ratios above 4, in particular in the machine direction, is not suggested nor disclosed in this document. The plasticizers are added to the compositions of EP-A-1 514 902 to increase the fracture toughness of the PLA matrix and thus reducing splitting of the tape. However, this solution has the effect of reducing the elastic modulus of the materials. Consequently, the materials described in EP-A-1 514 902 are disclosed to have an E-modulus that is generally less than 1.5 GPa, which is relatively low. Addition of some plasticizers, also known as internal lubricants, is known to lead to increased creep rates, as is easily observable from the impact in the Tg of the modified polymers as described by Baiardo et al. (Journal of Applied Polymer Science, 90 (2003) 1731-1738). High creep rates are in many situations, in particular for the applications envisaged by the present invention, unacceptable. Also these internal lubricants can sometimes be leached or just migrate to the surface of the material and lead to fragile plastics, lower knottability due to a slippery surface on the ropes or yarns, and/or diseases in case of incompatibility with the plants.

JP-A-2004/115051 discloses packaging bands comprising a blend of 10-45 wt % PLA and an aliphatic-aromatic copolyester. The bands are provided with surface irregularities at least on one face. Aliphatic-aromatic copolyesters are extensively used to improve processability of PLA and may give higher tenacities in the as-produced tapes and yarns. Nevertheless, these copolymers were found to be insufficiently UV stable and require UV stabilization in order to be used in applications where the material would be exposed to sunlight. On the other hand, PLA as a neat polymer (viz. comprising more than 95 wt % PLA, preferably more than 97 wt %, more preferably more than 99 wt %) was found to offer a very good UV stability, whereas addition of copolyesters of the type described in JP-A-2004/115051 in levels as low as 5 wt % already lead to accelerated degradation, as can be seen from Material Comparison Example 1 below.

JP-A-2003/260733 discloses a biaxially stretched film comprising PLA based on non-racemic lactic acid that is enriched in the L-enantiomer. The biaxial stretching is carried out at X/Y is between 0.9 and 2.0, wherein X is the stretch ratio in the machine direction and Y is the stretch ratio in the transversal direction. Total stretch ratios in the machine direction of more than 4 are not disclosed nor suggested in the document. The tear strength in the lateral direction is very low, less than 50 mN, apparently because film cutting properties are a concern.

The PLA products of the present invention have the shape of a tape, film or yarn or similar shape. In general they are characterized by a length that is considerably longer than its thickness. Typically the product is a string-shaped object having a length that is more than 100 times its thickness. For instance, a typical reel may comprise ca. 5000 m of tape having a thickness of 0.1 mm or less. The tape may also be twisted, in which case a typical diameter is about 2.5 mm. Its cross-section can be any shape. Typically it is circular, square or rectangular. Also the product may be composed of multiple filaments.

To improve the mechanical properties of the PLA products, the present inventors have done extensive research and have in particular investigated the possibility to improve these properties by applying one or more stretching (or drawing) steps. In this respect it is important to note that not all polymeric materials are "stretchable" in a practical sense, viz. stretchable on an industrial scale using automated processes with a high throughput, e.g. in the order of kilograms/minute (e.g. 1 kg/min) or more. Many polymeric materials have a strength that is insufficient to apply stretching on a practical scale. This can be caused by the physical properties of the polymer and/or by inhomogeneities in the product.

Up until now it was believed that PLA products of the above-mentioned type (tapes, films, yarns, etc.) could not be stretched on an industrial scale, because the products were very susceptible to break. If such a PLA product was wound on an industrial stretching apparatus, e.g. of the type shown in FIG. 1, it was believed that no operation on an industrial scale was possible, unless special measures were taken, such as the addition of considerable amounts of plasticizer, because the product could break before any relevant stretching is effected.

The present inventors have found that by carefully selecting the PLA starting material, it turned out to be possible to stretch tapes, films, yarns and the like comprising this PLA at a total draw ratio of more than 1:4. It was furthermore found that stretching to a draw ratio of more than 1:4 in one stretching step is not always possible and may lead to breakage of the material. Therefore, preferably the stretching to a total stretch ratio is carried out in more than one stretching step, wherein in the first stretching step the draw ratio is below 1:4 and the second or further stretching step is carried out with a total draw ratio of more than 1:4, more preferably more than 1:5, even more preferably more than 1:6. Generally it is preferred to keep the total draw ratio below 1:11, preferably below 1:8. By carrying out the stretching step whitening of the PLA material is observed. This is indicative of an increased strength. By carrying out the stretching in a multistage stretching step excellent control of the material's properties can be obtained.

From the prior art, for instance from JP A 2003/260733, bi-axial stretching has also been used for the production of PLA tapes. However, this known use of bi-axial stretching was aimed at reducing the tear-strength of the films, apparently to make them suitable for high speed cutting operations. This limited bi-axial stretching (biaxial stretch ratio aspect of 2 or less), has no effect on the material's already low fracture toughness. This can be clearly seen from Example 6 below. Unstretched PLA has a very low elongation at failure and tenacity, which is reflected in the poor energy absorption of a tape made from such material. During stretching, PLA undergoes a transition from glassy to semicrystalline due to the strain-induced alignment of the molecules. This is reflected by a change in colour of the tapes or films from transparent to white due to crazing. This effect is displayed at different stretch ratios depending on the temperature and higher temperature stretching moves this effect to higher stretch ratios. The elongation at failure and energy absorption reach an optimum just before the tape turns white. With higher stretching, the tenacity keeps growing but the fracture toughness of the produced films or tapes goes down again. Uni- or bi-axially stretching below a total stretch ratio (SR) of 4 will produce films and tapes that are relatively weak and difficult to handle.

Thus in one aspect the present invention is directed to a tape, film or yarn or the like comprising PLA, being drawn at a total stretch ratio of at least 1:4. It is noted, that according to the inventors' knowledge a neat PLA tape has not been previously drawn at these high stretch ratios. As the skilled person is well aware, by stretching the product, it changes structurally, inter alia in that the molecules (polymeric chains) are rearranged. This changed structure is reflected by an increased tensile strength and an increased elasticity modulus (E-modulus). Thus the tensile strength and/or the E-modulus are in fact product features and can be used to characterize the product. In accordance with the invention, products may be provided having a tensile strength of 150 MPa or more, an elongation at break of typically 7-25% and an E-modulus of 4.5 GPa or more. As a comparison, unstretched PLA typically has a tensile strength of about 60 MPa, an elongation at break of 1% and an E-modulus of about 3 GPa.

The E-modulus as used herein can be determined using methods known in the art. Unless stated otherwise, all values used herein are obtained using the method of standard test EN 10002.

The products of the inventions are preferably made by either cast-film extrusion or by blown film extrusion. The total stretch ratio as used herein primarily refers to unidirectional stretching, in particular to stretching in the machine (longitudinal) direction. However, some transversal stretching can generally not be avoided, in particular when blow-film extrusion is carried out. In accordance with the present invention, the total stretch ratio in the machine direction (X) is more than 4, whereas the total stretch ratio in the direction transverse to the film (Y) is preferably less than of 1.5, so that the ratio of these stretch ratios (X/Y, the biaxial stretch ratio aspect) is 2.7 or more but preferably 4 or more.

One of the parameters that was found to be of influence on the stretchability is the PLA's glass transition temperature, Tg. In accordance with the present invention, if the material is to be stretched in a single stretching step, the PLA should preferably have a Tg of 60° C. or more, more preferably 60-75° C. This is higher than the Tg of most commercially obtainable PLA, which typically have a Tg of about 50° C. PLA products having a Tg lower than 60° C., e.g. 58° C. were found to be less suitable to process applying a single stretching step. However, when more than one stretching step is applied, these materials may also be used.

Preferably PLA is used which is enantiomerically enriched, preferably with the L-enantiomer being the major enantiomer, more preferably more than 85 wt % of the monomeric units making up the PLA is L-lactic acid, even more preferably more than 90 wt %, most preferably between 96-98 wt %. It was found that this improves the processability and mechanical properties required for the application in horticulture.

Another parameter that was found to be of great influence on the stretchability is the PLA's melt temperature, Tm. In accordance with the present invention, if the material is to be stretched in a single stretching step, the PLA should preferably have a Tm of 160° C. or less, preferably 130-160° C., more preferably about 150° C. This is lower than the Tm of most commercially obtainable PLA, which typically have a Tm of about 170-185° C. However, when more than one stretching step is applied, PLA products having a Tm higher than 160° C. may also be used.

The PLA products of the invention may further comprise additives to improve processability or change optical properties. Preferably the product is free or essentially free (i.e. typically containing less than 0.5 wt %) of plasticizers.

An important advantage of the use of PLA in horticulture is that it does not or hardly degrade under the influence of UV radiation, in contrast to other materials used for this purpose, such as polypropylene, which usually for this reason requires the addition of a UV stabilizer. No UV stabilizers need to be added to the products of the present invention. In one embodiment of the invention, no additives are present and the product essentially consists of PLA, viz. more than 95 wt % of the product is PLA. Preferably more than 97 wt %, more preferably more than 99% of the product is PLA.

The products of the present invention show excellent compostability, which can be further enhanced by providing a high specific surface area brought about by the fibrillation. Thus the materials of the invention typically degrade when composted at the same or comparable rate as plant material or even faster.

In a preferred embodiment, the tapes are produced using a setup as schematically depicted in FIG. 1.

With reference to FIG. 1, in one embodiment of the process of the invention the raw PLA material, usually in the form of pellets, is fed to an extruder, where it is forced through dye 2. Subsequently the material is cooled by feeding it over roller 3 which is placed in a bath of water, having a temperature of typically 15-45° C. The material is then fed to slitter 4, where the tape is cut into two or more strips. A first stretching step is carried out by first feeding the material to roller 1, then to a first oven, where it is heated to a temperature of typically 75-95° C., preferably 80-90° C., and then to roller 2. By choosing the roller speed for roller 2 higher than the roller speed for roller 1, the PLA material is stretched. Subsequently, a second stretching step is carried out by first feeding the material to a second oven, where it is heated to a temperature of typically 95-120° C., preferably 100-110° C., and then to roller 3, wherein the roller speed for roller 3 is chosen higher than the roller speed for roller 2. Finally the product is winded on reels.

Preferably, godet rollers are used for rollers 1-3. Preferably, after the film has been formed from the extruder dye, it is fed to a cooling bath, typically a water-filled bath at a relatively low temperature of 15-45° C., preferably about 30-35° C. This "freezes" the film and prevents so-called neck-in of the film.

Preferably, the extruder is purged before stretching with polyethylene (PE) having a melt flow index of at least 2, preferably at least 5, e.g. around 8.

The materials of the invention can also be prepared by blown film extrusion (also referred to as the tubular film extrusion). Blown film extrusion is a process known per se. The process involves extrusion of a plastic through a circular die, followed by "bubble-like" expansion. In this way, tubing (both flat and gusseted) can be produced in a single operation. The film width and thickness can be controlled by factors such as the volume of air in the bubble (air flow rate), the output of the extruder and the speed of the haul-off. Biaxial orientation of the film can be controlled by transport speed and air flow rate.

The products of the present invention have an excellent elongation to break, typically of 7-20%, preferably about 10%. This is very important for the above-indicated use in horticulture because it allows for easy handling and tying.

Furthermore, the products of the invention are characterized by an excellent shrinkage at elevated temperature. For temperatures up to about 60° C. the shrinkage may be as low as 0% or very close to that as can be observed from the data in Example 8.

The product of the present invention is further characterized by having relatively low creep compared to string-like products made from e.g. polypropylene (PP). Creep as used herein is defined as the tendency to slowly move or deform under long term exposure to levels of stress. String-like products having low creep are desirable for the use in horticulture, e.g. to tie up plants or parts thereof. Plants tied up by string-like products will exert stress on the string-like products upon growing. Such stress may result in deformation of the string-like product, which may result in hanging of the plant and consequently the need to retie the plant. Currently, string-like products used in horticulture are mainly made from PP, which products have high creep and thus suffer from the above disadvantages. A comparison between the creep of PP and that of the products of this invention is given below in Example 7. These creep tests were carried out with loads of 20% of breaking load and 40% of breaking load. The present invention provides for a better performance with regards to creep when compared to PP. The product of the present invention has a low enough creep that, when used in horticulture for tying up plants or parts thereof, retying of the plant is not needed upon growing of the plant. Thus increased deformation in the twine due to plant growth can be avoided.

The use of plasticizers as described in the prior art (EP-A-1 514 902) is strongly discouraged in this invention since such additives may adversely affect the creep behavior of the PLA material.

From the prior art, in particular from JP-A-2004/115051, materials are known having embossing on one or both surfaces of the film or tape to increases the roughness of the material. Embossing the products however produces stiffer films by creating ripples on the surface, which make the film hard to the touch and can harm plants by abrasion in horticultural applications. Embossed films and tapes also have a higher second moment of area which hamper knotting, twisting and the free-flow of such tapes in high speed operations, both manual and machine-aided. The materials of the present invention are preferably smooth. The products of this invention can be fibrillated very well using a fibrillation roller (e.g. a needle roller or pin roller). Unfibrillated product is tough and hard to handle. Unfibrillated product has to be forced to bend and may create cracks at random. These cracks may reduce the strength of the product and may even lead to failure of the product. Fibrillated product is much smoother and will fold on the cuts. This results in a product having the desired flexibility, so that the tape can easily be twisted creating a round yarn. Said flexibility is necessary for the product to be used in horticulture e.g. to tie up plants or parts thereof. An added advantage of the fibrillating step is that the surface roughness is increased, which improves the knotting properties.

Figure 2:
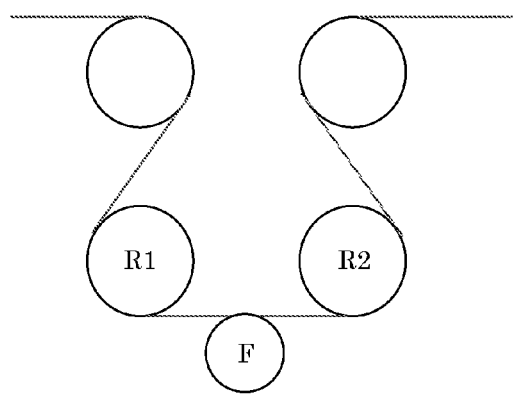

The fibrillation roller is typically placed between two rollers over which the product of the present invention is fed, such as depicted schematically in FIG. 2. To obtain the desired flexibility, the speed of the fibrillation roller (F) is preferably higher than the speed of the first rollers (R1). The speed of the second roller (R2) is typically slightly higher than the speed of the first roller (R1) (e.g. 2 m/min higher). This is needed to keep the product tensioned when they are going over the roller and to avoid the product from getting stuck at the needles.

The speed of the fibrillator roller is normally expressed in fibrillation ratio (FR), which is the ratio of fibrillation roller speed to the first roller speed. The FR is preferably between 1.2 and 1.7, more preferably between 1.25 and 1.35. An FR lower than 1.2 will give very short stripes. An FR higher than 1.6 will result in a hairy product. The arrangement of the needles on the fibrillation roller was found not to have a significant influence on the product of the present invention. For example, an arrangement may be used of about 10 needles per cm.

In a preferred embodiment, a fibrillation roller is placed in the process schematically depicted in FIG. 1 between roller 3 and the last roller before the winding step.

In a number of cases, fibrillation of the products is not necessary. Examples of these are: small tapes, which do not need folding, bending or twisting; thin tapes, which are naturally smoother than thick tapes; and tapes with a profile, which tapes use the profile to form the cracks, which cracks are therefore controlled.

The products of the invention can have any string shaped form, such as films, tapes, yarns, multifilaments (comprising a bundle of filaments) or the like. For horticulture, yarns are preferred because due to their thickness such products minimize the risk of cutting the plant material. Yarns are made from one or more tapes twined or twisted around each other. The cross-section of such a yarn is round and has a thickness of about 2-3 mm. The thickness of the tapes used in the yarns is typically less than 0.1 mm, preferably 0.03-0.09 mm, more preferably about 0.07 mm. Such tapes, i.e. tapes having such a small thickness, are preferred, because thin tapes are softer, which is desirable to minimize the risk of damaging plant material.

The products of the invention may also be used as the main ingredient in ropes. Preferably, such a rope contains at least 80 wt. %, more preferably at least 90 wt. % of the product according to the present invention with respect to the total weight of the rope.

MATERIAL COMPARISON EXAMPLE 1

Three different materials were tested to investigate the influence of PLA content on UV sensitivity as reflected by the remaining strength after exposure.

The first sample comprised 100% PLA grade 2002D from NatureWorks.

The second sample was a blend of 95 wt % PLA grade 2002D from NatureWorks with 5 wt % aliphatic-aromatic copolyester (Ecoflex™ F BX 7011 from BASF).

The third sample was 75 wt % PLA grade 2002D from NatureWorks with 25 wt % aliphatic-aromatic copolyester (Ecoflex™ F BX 7011 from BASF).

All three samples were exposed to UV in a QUV Atlas 2000 system during 800 hours under a cycle of 8 hours irradiation and 4 hours of condensation. The irradiation step used was of 0.77 W/m$^2$ using standard UV-A 340 nm lamps at a temperature of 60° C. and the condensation step was carried out at a temperature of 50° C. The strength was then measured after exposure and compared to the original strength.

The first sample had a remaining strength of 99%, the second sample of 83% and the third sample of 64%, thus illustrating the UV stability of the high PLA-content sample.

EXAMPLE 1

A film was extruded from 100% PLA (Tg=65° C. and Tm=150° C.) and subsequently cut into tapes. These tapes were then stretched in a ratio varying form 1:6-1:8.5 in a single stretching step using a temperature of 100° C. The properties of the thus obtained tapes are shown in Table 1.

All the strength measurements were carried out using a tensile tester with a strain rate of 100%/min and a gauge length of 500 mm in a conditioned temperature room.

TABLE 1

| Stretch Ratio | Runnage (denier) | E- modulus (GPa) | Strength (MPa) | Elongation (%) | Thickness (micron) |
|---|---|---|---|---|---|
| 1:6 | 4880 | 3.65 | 313.5 | 24.5 | 99 |
| 1:8 | 3740 | 3.70 | 339.9 | 18.1 | 88 |
| 1:8.5 | 3590 | 3.85 | 343.2 | 17.9 | 88 |

EXAMPLE 2

Example 1 was repeated using a stretching temperature of 80° C. and a stretch ratio of 1:7. The resulting tapes were fibrillated using a fibrillation roller with 10 pens/cm and an FR of 1.6. The properties of the thus obtained fibrillated tapes are shown in Table 2.

TABLE 2

|  | Runnage (denier) | E-modulus (GPa) | Strength (MPa) | Elongation (%) | Thickness (micron) |
|---|---|---|---|---|---|
| Tape | 11740 | 3.57 | 175 | 11.5 | 75 |

Two of the fibrillated tapes obtained above were twisted around each other creating a yarn. The properties of the obtained yarn are shown in Table 3.

TABLE 3

|  | Runnage (denier) | E-modulus (GPa) | Strength (MPa) | Elongation (%) | Thickness (micron) |
|---|---|---|---|---|---|
| Yarn | 23400 | 3.43 | 160 | 12.9 | 75 |

EXAMPLE 3

A film was extruded from 100% PLA (Tg=55-60° C. and Tm=160-170° C.) and subsequently cut into tapes. Subsequently, these tapes were first stretched to a stretch ratio of 1:3.6 using a first stretching step and then stretched to a total stretch ratio of 1:7.8 using a second stretching step. The stretching temperatures of the first and second stretching step were 80 and 100° C., respectively. After stretching, the resulting tapes were fibrillated using a fibrillation roller with 5 pens/cm and a FR of 1.4. One of the thus obtained fibrillated tapes was twisted into a yarn. The properties of the untwisted fibrillated tape and the yarn are shown in Table 4.

TABLE 4

|  | Runnage (denier) | E-modulus (GPa) | Strength (MPa) | Elongation (%) | Thickness (micron) |
|---|---|---|---|---|---|
| Tape | 12520 | Not measured | 226 | 12.1 | 61 |
| Yarn | 12640 | 4.65 | 204 | 9.4 | 61 |

A creep test was performed on the yarn, as well as on a similar standard yarn made from PP. The test was done by bringing 50% load at break on a specified length of yarn for a longer period of time. After 100 hours the creep of the PLA was stable at 4.5%, where the creep on the PP was stable at 19%, meaning that the PP yarn has extended 4.2 times more then the PLA yarn.

EXAMPLE 4

A film was extruded from a mixture comprising 98% PLA (Tg=55-60° C. and Tm=145-155° C.) and 2% plasticizer and subsequently cut into tapes. These tapes were first stretched to a stretch ratio of 1:4 using a first stretching step and then stretched to a total stretch ratio of 1:10.2 using a second stretching step. The stretching temperatures of the first and second stretching step were 90° C. and 110° C. respectively. After stretching, the resulting tapes were fibrillated using a fibrillation roller with 5 pens/cm and an FR of 1.9. The properties of the thus obtained tapes are shown in Table 5.

TABLE 5

|  | Runnage (denier) | E-modulus (GPa) | Strength (MPa) | Elongation (%) | Thickness (micron) |
|---|---|---|---|---|---|
| Yarn | 5130 | 4.34 | 340 | 14.2 | 55 |

EXAMPLE 5

A film comprising 100% PLA (Tg=55-60° C. and Tm=145-155° C.) was blown-extruded and subsequently cut into tapes. The film had a blow-up ratio of 1:1.2. These tapes were first stretched to a stretch ratio of 1:4 using a first stretching step and then stretched to a total stretch ratio of 1:10.2 using a second stretching step. The stretching temperatures of the first and second stretching step were 100° C. and 110° C. respectively. After stretching, the resulting tapes were fibrillated using a fibrillation roller with 20 pens/cm and an FR of 1.6. The properties of the thus obtained tapes are shown in Table 6.

TABLE 6

|  | Runnage (denier) | E-modulus (GPa) | Strength (MPa) | Elongation (%) | Thickness (micron) |
|---|---|---|---|---|---|
| Yarn | 10500 | 2.27 | 296 | 13.1 | 60 |

EXAMPLE 6

This example shows the influence of stretching regime on mechanical properties such as tenacity, elongation at break and energy absorption.

100% PLA samples (grade 2002D from NatureWorks) were subjected to different stretching sequences, as indicated in Table 7 below. The tenacity and elongation at break were measured using the methods indicated hereinabove. Also, for comparative purposes, the energy absorption was defined as the area beneath the curve of the stress-strain diagram.

TABLE 7

| 1st SR | 2nd SR | Tenacity [gf/den] | Elongation at failure [%] | Energy absorption [a.u.] |
|---|---|---|---|---|
| 0 | 0 | 0.55 | 3.41 | 0.94 |
| 3.75 | 0 | 1.06 | 5.50 | 2.91 |
| 5 | 0 | 1.9 | 12.78 | 12.1 |
| 3.75 | 5 | 1.7 | 15.15 | 12.9 |
| 5 | 7.5 | 2.15 | 9.39 | 10.1 |
| 5 | 8 | 2.23 | 8.43 | 9.4 |

EXAMPLE 7

This example compares creep of the materials of the present invention to values obtained for polypropylene (reference). Different samples of 100% PLA grade 2002D from NatureWorks and PP grade 040-G1E from Repsol were subjected to loads of 20% of breaking load (BL) and 40% of their breaking load, respectively. Creep was measured over a prolonged period of time. The results are given in Table 8.

TABLE 8

| | Creep strain [%] | | | |
|---|---|---|---|---|
| Time [h] | present invention (20% BL) | present invention (40% BL) | PP benchmark (20% BL) | PP benchmark (40% BL) |
| 0 | 0 | 0 | 0 | 0 |
| 0.1 | 1.2 | 1.8 | 2.5 | 5.5 |
| 1 | 1.2 | 2.2 | 2.8 | 6.9 |
| 10 | 1.4 | 2.9 | 4.5 | 8.9 |
| 100 | 1.6 | 3.2 | 5.3 | 13.4 |

EXAMPLE 8

Free shrinkage in samples from Example 6 using the Testrite method with 2 minutes shrinkage time and a force of 88 mN.

TABLE 9

| Temperature [° C.] | Free shrinkage [%] |
|---|---|
| 60 | 0.0 |
| 70 | 0.3 |
| 80 | 3.0 |
| 90 | 8.0 |

The invention claimed is:

1. String product having an elongation at break of 7-25%, made by cast-film extrusion or by blown film extrusion, comprising PLA, being drawn in the machine direction at a total stretch ratio of at least 1:4 and with a minimal biaxial stretch ratio aspect (machine direction X/transverse direction Y) of 4, wherein the total stretch ratio refers to unidirectional stretching, by which stretching whitening of the PLA material is observed and wherein more than 95 wt % of the product is PLA.

2. Product according to claim 1, wherein more than 97 wt % of the product is PLA.

3. Product according to claim 1 having a tensile strength of at least 150 MPa or more and an E-modulus (as measured by standard test EN 10002) of 3 GPa or more.

4. Product according to claim 1, wherein said PLA has a Tg of at least 60° C.

5. Product according to claim 1, wherein said PLA has a Tm of less than 160° C.

6. Product according to claim 1, which is fibrillated for at least part of its length and/or at least part of its circumference.

7. Product according to claim 1, wherein the total stretch ratio in the machine direction X of at least 1:4 is obtained by more than one stretching step, wherein in the first stretching step the draw ratio in the machine direction is below 1:4 and the second or further stretching step is carried out with a total draw ratio in the machine direction of more than 1:4.

8. Product according to claim 1, wherein the total stretch ratio in the machine direction X is between 1:5 and 1:8.

9. Process for producing a product, comprising the steps of:
 (a) feeding PLA material wherein more than 95 wt % is PLA to an extruder;
 (b) cooling the extruded PLA material to a temperature of 15-45° C.;
 (c) optionally cutting the cooled material into two or more strips;
 (d) a first stretching step, wherein the material is fed to a first roller, then to a first oven, where it is heated to a temperature of 75-95° C., and then to a second roller, wherein the roller speed of the second roller is higher than the roller speed of the first roller;
 (e) a second stretching step, wherein the material is fed to a third roller, then to a second oven, where it is heated to a temperature of 95-120° C., and then to a fourth roller, wherein the speed of the fourth roller is higher than the speed of the third roller, wherein the total stretch ratio is at least 1:4 in the machine direction (X) and the maximum total stretch ratio is 1:1.5 in the direction transverse to the machine direction (Y), with a minimum biaxial stretch ratio aspect (X/Y) of 2.7, wherein said process produces a product according to claim 1.

10. Process according to claim 9, which comprises a blown film extrusion step.

11. A method of using a product according to claim 1 in horticulture, comprising a step of tying up a plant or a piece of a plant using said product.

12. Rope containing at least 80 wt. % of a product according to claim 1.

13. A product according to claim 3, wherein the product has an elongation at failure of 10-15%.

14. A product according to claim 8, wherein the total stretch ratio in the machine direction X is between 1:6 and 1:8.

15. A process according to claim 9, wherein, in step (b), the temperature is 30-35° C.; wherein, in step (d), the temperature is 80-90° C. and wherein, in step (e), the temperature is 100-110° C.

* * * * *